US009009083B1

(12) United States Patent (10) Patent No.: US 9,009,083 B1
Shetty et al. (45) Date of Patent: Apr. 14, 2015

(54) MECHANISM FOR AUTOMATIC QUANTIFICATION OF MULTIMEDIA PRODUCTION QUALITY

(75) Inventors: Sanketh Shetty, Sunnyvale, CA (US); Jonathon Shlens, San Francisco, CA (US); Hrishikesh Aradhye, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/396,965

(22) Filed: Feb. 15, 2012

(51) Int. Cl.
  *G06F 15/18* (2006.01)
  *G06F 9/30* (2006.01)
(52) U.S. Cl.
  CPC ................... *G06F 9/30145* (2013.01)
(58) Field of Classification Search
  CPC .............................. G06F 15/18; G06N 99/005
  USPC .......................................................... 706/12
  See application file for complete search history.

(56) References Cited

U.S. PATENT DOCUMENTS

| | | | | |
|---|---|---|---|---|
| 2009/0262198 | A1* | 10/2009 | Yamagishi et al. | 348/180 |
| 2010/0191689 | A1* | 7/2010 | Cortes et al. | 706/46 |
| 2011/0185384 | A1* | 7/2011 | Wang et al. | 725/34 |

OTHER PUBLICATIONS

Hoβfeld, Tobias, et al. "Quantification of YouTube QoE via crowdsourcing." Multimedia (ISM), 2011 IEEE International Symposium on. IEEE, 2011.*
Khan, Asiya, Lingfen Sun, and Emmanuel Ifeachor. "Content clustering based video quality prediction model for MPEG4 video streaming over wireless networks." Communications, 2009. ICC'09. IEEE International Conference on. IEEE, 2009.*
Pinson, Margaret H., and Stephen Wolf. "Comparing subjective video quality testing methodologies." Visual Communications and Image Processing 2003. International Society for Optics and Photonics, 2003.*
A.K. Moorthy and A.C. Bovik, "Visual Quality Assessment Algorithms: What Does the Future Hold?", International Journal of Multimedia Tools and Applications, Special Issue on Survey Papers in Multimedia by World Experts, vol. 51 No. 2, Feb. 2011, 20 pages http://live.ece.utexas.edu/publications/.

* cited by examiner

*Primary Examiner* — Kakali Chaki
*Assistant Examiner* — Kevin W Figueroa
(74) *Attorney, Agent, or Firm* — Lowenstein Sandler LLP

(57) ABSTRACT

A mechanism for automatic quantification of multimedia production quality is presented. A method of embodiments includes assembling data samples from users, the data samples indicating a relative production quality of a set of content items based on a comparison of production quality between content items in the set, extracting content features from each of the content items in the set, and learning, based on the data samples from the plurality of users, a statistical model on the extracted content features, wherein the learned statistical model can predict a production quality of another content item that is not part of the set of content items.

20 Claims, 6 Drawing Sheets

400

```
┌─────────────────────────────────────────────────────────────────┐
│ Receive set of test data that includes relative production quality comparison │
│ results of subsets of videos                                    │
│                                                           410   │
└─────────────────────────────────────────────────────────────────┘
                                  ↓
┌─────────────────────────────────────────────────────────────────┐
│ For each video of the received test data set, extract and/or obtain content │
│ features for use in production quality score assessment         │
│                                                           420   │
└─────────────────────────────────────────────────────────────────┘
                                  ↓
┌─────────────────────────────────────────────────────────────────┐
│ Learn statistical model on extracted features that predicts, as closely as │
│ possible, the raters' perception of relative production quality within each │
│ video subset                                                    │
│                                                           430   │
└─────────────────────────────────────────────────────────────────┘
                                  ↓
┌─────────────────────────────────────────────────────────────────┐
│ Assign scores to each video as a video production quality measure │
│                                                           440   │
└─────────────────────────────────────────────────────────────────┘
                                  ↓
┌─────────────────────────────────────────────────────────────────┐
│ Provide learned model to production quality measure server      │
│                                                           450   │
└─────────────────────────────────────────────────────────────────┘
                                  ↓
┌─────────────────────────────────────────────────────────────────┐
│ Run iterations of statistical model learning based on new/updated received │
│ test data collection sets and new/updated extracted features from videos │
│                                                           460   │
└─────────────────────────────────────────────────────────────────┘
```

```
┌─────────────────────────────────────────────────────────────┐
│ Apply learned model to content items to determine a         │
│ production quality score for the content items              │
│                                                         510 │
└─────────────────────────────────────────────────────────────┘
                              │
                              ▼
┌─────────────────────────────────────────────────────────────┐
│ Utilize the production quality score as a filter for        │
│ content items that are part of a search result              │
│                                                         520 │
└─────────────────────────────────────────────────────────────┘
                              │
                              ▼
┌─────────────────────────────────────────────────────────────┐
│ Utilize the production quality score to provide feedback to │
│ a user owning a content item, the feedback regarding        │
│ features of the content item that can be improved to        │
│ increase the overall production quality score of the        │
│ content                                                     │
│                                                         530 │
└─────────────────────────────────────────────────────────────┘
                              │
                              ▼
┌─────────────────────────────────────────────────────────────┐
│ Utilize production quality score to differentiate           │
│ advertisement placement options to advertisers and,         │
│ consequently, to differentiate pricing options for the      │
│ placement options                                           │
│                                                         540 │
└─────────────────────────────────────────────────────────────┘
```

FIGURE 5

MECHANISM FOR AUTOMATIC QUANTIFICATION OF MULTIMEDIA PRODUCTION QUALITY

TECHNICAL FIELD

Embodiments of the present disclosure relate to the field of shared content hosting platforms and, more particularly, to a mechanism for automatic quantification of multimedia production quality.

BACKGROUND

With the advent of shared content hosting platforms, a wide range of different types of multimedia, such as video content, image content, audio content, and so on, is finding its way to the Internet. In specific terms of the shared content hosting platform and online videos, the production quality of online video has a significant bearing on its potential to be monetized and the quality of user experience. Low quality videos often contain jarring camera motions, blocky pixel artifacts, out-of-focus picture, and poor lighting. Such videos negatively affect users' interest in consuming video content. As a result, there is value in identifying videos with good production quality and highlighting them on a shared content hosting platform.

Identifying a high production quality video is a challenging problem. There are many different metrics and heuristics that are correlated with video quality. However, no principled methods generally exist for learning how these different metrics and heuristics interact to predict the production quality of a video as perceived by a user.

There are three key problems generally encountered with previous work in this area. First, previous methods rely on access to a reference (usually an undistorted) image/video against which to compare and estimate image quality. However, for many media items, only one copy of the media item is available. Second, previous methods rely on raters providing absolute scores to an item in isolation from other items in the set. This can be unreliable because subjective judgment of quality is often relative and inconsistent. Third, previous methods generally study individual video quality features in isolation; they do not examine how the features combine to produce an overall measure of perceptual quality.

SUMMARY

In one embodiment, a mechanism for automatic quantification of multimedia production quality is presented. A method of embodiments of the disclosure includes assembling data samples from users, the data samples indicating a relative production quality of a set of content items based on a comparison of production quality between content items in the set, extracting content features from each of the content items in the set, learning a statistical model on the extracted content features. In one embodiment, the learning of the statistical model is based on the data samples from the plurality of users. In addition, the statistical model is learned to predict a production quality of other content items that are not part of the set of content items.

In some embodiments, the content features include visual signal features, audio signal features, metadata, and text signal features. In addition, in one embodiment, assembling the data samples further includes presenting a subset of the set of content items to each of the plurality of users, and receiving a selection from each user of a content item of the subset that the user believes has a better relative production quality over the other content items of the subset. In some embodiments, the subset is selected from the set of content items via active sampling.

In one embodiment, the method can provide the production quality score to an owner of another content item as feedback to inform the owner of (1) a production quality of the another content item, and/or (2) one or more content features of the another content item that can be improved to increase the production quality score of the another content item. In other embodiments, the method can provide the production quality score as metadata of the another content item that is used to filter the another content item with respect to other content items in search results. In yet another embodiment, the method can utilize the production quality score as a feature for advertisement placement associated with the another content item. In some embodiments, the learned statistical model may be applied to extracted content features of the other content items that are not part of the set of content items in order to assign a production quality score to the other content items In additional embodiments, computing devices for performing the operations of the above described embodiments are also implemented. Additionally, in embodiments of the disclosure, a computer readable storage media stores instructions for performing the operations of the above described embodiments.

BRIEF DESCRIPTION OF THE DRAWINGS

The present disclosure will be understood more fully from the detailed description given below and from the accompanying drawings of various embodiments of the disclosure.

FIG. 4 is a flow diagram illustrating one embodiment for a method of modeling and predicting production quality in a shared content hosting platform.

FIG. 5 is a flow diagram illustrating one embodiment for a method of calculating a production quality score and applying the calculated production quality score in different use cases.

DETAILED DESCRIPTION

A mechanism for automatic quantification of multimedia production quality is described. Embodiments of the disclosure focus on the automatic quantification of production quality of multimedia, such as audio, images and video. While details are providing herein specifically relating to video as an example for clarity of explanation, it shall be appreciated that such details may be equally applicable to other types of media, e.g., audio (e.g., music), images (e.g., photos), documents, text (e.g., tweets), flash-content, etc., as applicable.

Certain embodiments of this disclosure initially assemble a data set of human judgments on the relative quality of a set (e.g., a pair, triplet, quadruplet, etc.) of videos. Features of the video suited for measuring production quality are extracted from the sampled sets of videos. Using this assembled data set and the extracted feature data, a machine-learning system is trained to predict the human judgments of each set of videos. The learned model presents a method of weighting the relative importance of the extracted features in order to produce results consistent with the human-judged production quality of the videos. A score can then be associated with each video. In an exemplary embodiment, a video of higher production quality is assigned a higher score by the learned model. The score can then be associated with the video as a production quality measure of the video.

According to one embodiment, a method for automatic quantification of multimedia production quality includes assembling data samples from users, the data samples indicating a relative production quality of a set of content items based on a comparison of production quality between content items in the set. The method may also include extracting content features from each of the content items in the set. The method may further include learning a statistical model, based on the data samples from users, wherein the statistical model learned to predict a production quality of other content items that are not part of the set of content items.

Figure 1:
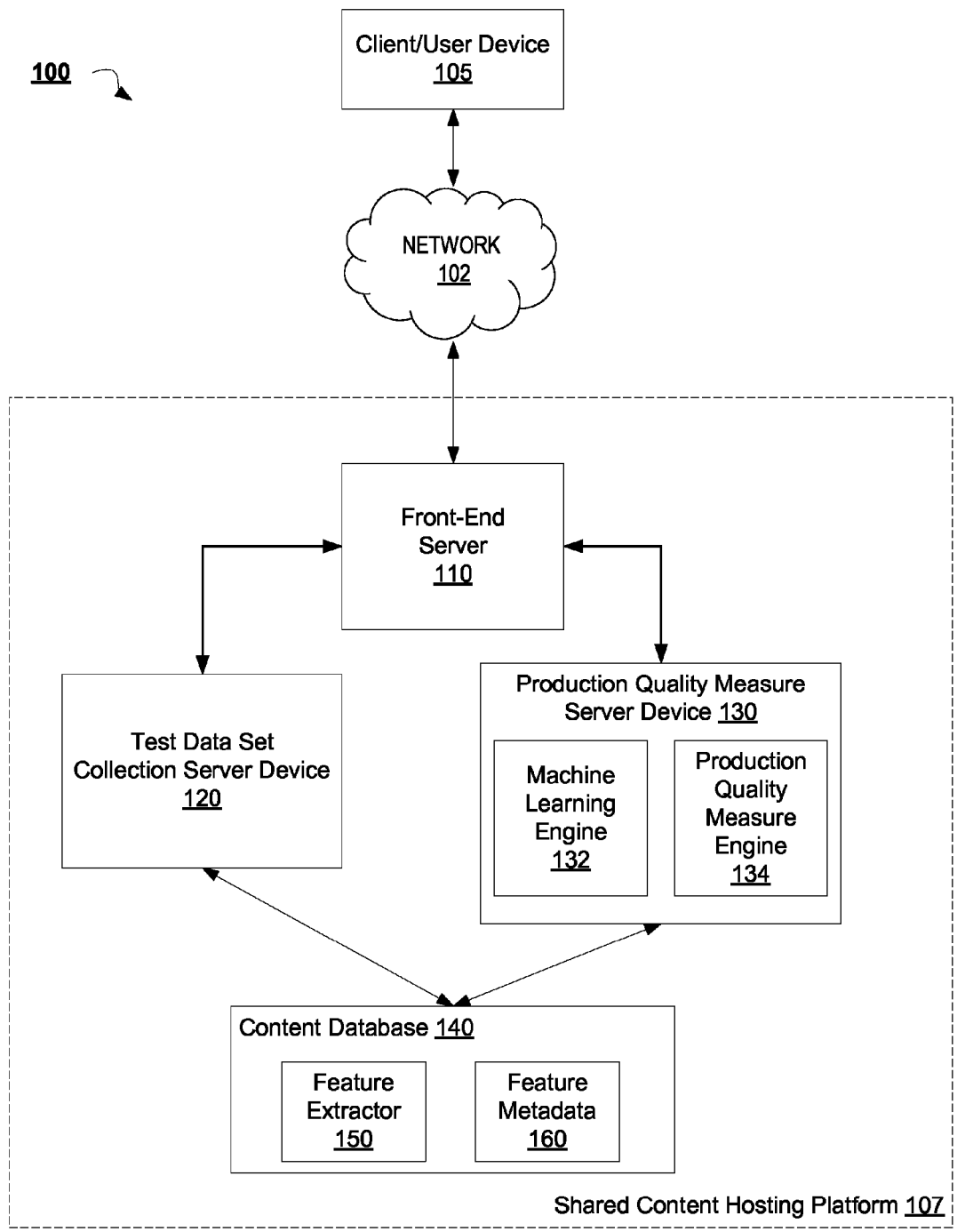
FIG. 1 illustrates an exemplary system architecture, in accordance with one embodiment of the present disclosure.

FIG. 1 illustrates an exemplary system architecture 100, in accordance with one embodiment of the present disclosure. System 100 includes a shared content hosting platform 107 including front-end server 110, a test data set collection server device 120, a production quality measure server device 130, and a content data store 140 (e.g., a content database). In FIG. 1, one or more client/user devices 105 are in communication over a network 102 with the shared content hosting platform 107 via front-end server 110. The network 102 may be or include the Internet and/or other networks, wired and/or wireless, such as an intranet, local area network (LAN), wide area network (WAN), cellular network or broadcast network.

The client/user device 105 may be any type of computing device, for example, a device including a processor, a computer-readable medium, and a memory. In some embodiments, the client/user device 105 may be executing a browser application or other application adapted to communicate over Internet-related protocols (e.g., TCP/IP and HTTP) and/or display a user interface. While only a single client/user device 105 is shown in FIG. 1, system 100 may support a large number of concurrent sessions with many client/user devices 105.

Moreover, embodiments of the disclosure may operate within a single server device or on multiple server devices. Although each of front-end server 110, test data set collection server device 120, production quality measure server device 130, and content database 140 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of system 100, a user accesses shared content hosting platform 107 via client/user device 105 over network 102. The front-end server 110 receives communications from the client/user device 105, and processes and/or directs these communications accordingly. In one embodiment, the front-end server 110 comprises a processing device and a computer-readable memory.

Front-end server 110 is communicably coupled to test data set collection server device 120 and production quality measure server device 130. Test data set collection server 120 and production quality measure server 130 may be implemented in hardware, software, firmware, or any combination of the above. Front-end server 110, test data set collection server 120, and production quality measure server 130 may operate in combination to provide shared content hosting platform 107 to end users, such as a user utilizing client/user device 105. End users may upload a variety of content to the shared content hosting platform 107 to share with other ends users via the shared content hosting platform 107. In addition or alternatively, other entities such as content providers and broadcasters may upload content to the shared content hosting platform 107 for sharing with various users.

In embodiments of the disclosure, shared content hosting platform 107 automatically quantifies the production quality of content uploaded to content database 140. Although the description herein discusses a mechanism to automatically quantify production content quality, embodiments of the disclosure can also be equally applicable to qualities, other than production content quality, that define content, such cuteness, attractiveness, funniness, and so on.

In order to provide automatic quantification of production quality of content uploaded to shared content hosting platform 107, embodiments of the disclosure initially assemble a data set of human judgments on the relative quality of a set of videos (e.g., a pair, triplet, quadruplet, etc.). In one embodiment, test data set collection server device 120 is configured to assemble this set of test data. In some embodiments, the assembly of the test data may also be known as ground-truth data collection. In embodiments of the disclosure, shared content hosting platform 107 notifies end users of the types of information that are stored by shared content hosting platform 107 and tested by test data set collection sealer device 120, and provides the end user the opportunity to opt-out of having such information assembled, analyzed, and/or shared.

In one embodiment, test data set collection server device 120 selects the videos for user review from content database 140. The videos may be selected randomly from the existing corpus of video content in the content database 140, e.g., to increase a probability of remaining relatively unbiased to the actual content of the video.

Once test data set collection server device 120 has gathered a video set, embodiments of the disclosure allow for multiple modalities for sampling from the gathered video set in order to obtain a subset of videos to present for rating to a user (i.e., the rater). In one embodiment, the subset is a pair of videos. In other embodiments, the subset may be a triplet of videos, quadruplet of videos, and so on, depending on the testing and configuration settings of the test data set collection server device 120. For purposes of the following description, test data set collection server device 120 is described as selecting a pair of videos for presentation to a rater. However, embodiments of the disclosure should not be limited to selecting solely pairs of videos as subsets.

In one embodiment, sampling from the randomly selected video set may be accomplished using filters. Test data set collection server device 120 may explicitly configure a set of criteria for pairing videos. For example, to ensure that the raters' judgment is not hindered by extraneous factors, the test data set collection server device 120 may select pairs of videos such that both videos are uploaded around a similar date, are of similar lengths, and/or have similar order of magnitude of views. As another example, the test data set collection server device 120 may apply filtering to ensure that the relative frame-rate and encoding quality of the videos are similar.

In another embodiment, the sampling may be accomplished using active sampling. Active sampling is also known in the field as optimal experimental design. An active sampling strategy includes assigning an initial (usually equal)

quality score to each video in the video set. Because the initial estimates of video quality are unreliable, videos are initially randomly paired and presented to raters. Depending on the raters' feedback, the quality scores of individual videos and the test data set collection server device's 120 confidence in these scores are updated. As this process continues, the sampling becomes less random. The test data set collection server device 120 may then pair videos with high uncertainty in relative quality together (e.g., the videos in the pair have an assigned quality score that is close together). As a result, active sampling can produce a reliable ranking given comparisons that are linear to the number of videos in the set, resulting in reduced time to gather a complete set of test data.

Although filtering and active sampling have been described above as possible sampling techniques, other sampling techniques may be also implemented to select the subsets of videos to be presented to a user for rating purposes.

The test data set collection server device 120 presents the selected subset (e.g., the pair) of videos to the raters and asks each rater to pick the video they believe has the best production quality. The raters may also be given a selection option for when they believe the videos are of comparable quality. In some embodiments, the test data set collection server device 120 also asks raters to compare the quality of the content in the subsets of videos. This content quality query can help to disambiguate the two axes of production quality versus video content quality, which can be important for determining if and how much the quality of the content affects raters' decisions regarding production quality.

The raters' resulting relative production quality opinions provide valuable insight into what factors affect a user's perception of video quality. In addition, the implementation of relative comparisons between videos avoids the use of absolute numbers to judge video quality. Typically, absolute numbers vary by user and are often inconsistent even within an individual user's set of rated videos. Using relative comparisons within a small set of videos simplifies the task from the rater's perspective, while providing valuable data for the shared content hosting platform 107 to learn from. In some embodiments, to ensure consistency, the test data set collection server device 120 collects data (i.e., production quality rating, content rating) for the same subset of videos from multiple raters. In addition, embodiments of the disclosure run test data set against a large number of raters using a large set of videos, in order to arrive at a consistent judgment of a relative ranking of videos in terms of production quality.

In some embodiments, the production quality "rating" is inferred from other actions of the user. This is also known as implicit sampling. For example, a set of video content may be presented to a user without explicitly asking the user to pick the best one in terms of production quality. Instead, the user's behavior (e.g., clicking the most relevant link) can be analyzed to determine such information. A sample scenario includes a user providing a search query and, in response, presenting a page of videos to the user. The user may scan the page and click on a video to watch. This click can be considered a signal indicating quality. Similarly, in a video-editing scenario, for example, users may make edits to their original video using a video editor (e.g., to improve contrast, reduce camera shake, etc.) and submit the result as their choice to be shown on the shared content hosting platform. The changes the user made and accepted are generally indicative of an improvement in video quality. The original video and the enhanced video can be treated as a video pair in the test data set collection server device 120 setup and regressed upon (as discussed below).

Once the set of videos has been sampled and production quality opinions from raters has been received, e.g., at the test data set collection server device 120, content "features" suited for measuring production quality can be extracted from the sampled sets of videos. In one embodiment, the content database 140 includes a feature extractor 150 that is configured to perform the feature extraction and valuation on each video. In some embodiments, the feature extraction is performed when the video is originally uploaded to the data store, e.g., content database 140. The extracted feature valuations may be stored in as feature metadata 160 in the content database 140, in association with their related videos. In other embodiments, the production quality measure server device 130 includes a feature extractor (not shown) to perform the feature extraction.

The content features to be extracted and valued may include a variety of classes of features. In one embodiment, exemplary classes of features include visual signals, audio signals, metadata, and text signals. Visual signals can include, but are not limited to, color composition, sharpness, blurriness, saturation, motion features (such as subject motion and camera motion), definition type (such as HD, SD, etc.), resolution, and face features (such as properties of the faces detected in the video, how many faces, etc.). Audio signals can include, but are not limited to, loudness, spectrogram, stabilized auditory images, tone, timbre, melody, beats, tempo, and so on. Metadata can include, but is not limited to, information about the camera capturing the video, editing software, resolution, file format, and so on. Text signals can include, but are not limited to, quality measures (such as spelling and grammar) on the text surrounding the video (e.g., title, description, and comments associated with the video).

In addition to the above exemplary listing of classes of features and specific features, several other video, audio, metadata, and text features may be extracted from content in embodiments of the disclosure. The content features extracted from the videos are engineered to be expressive measures of video quality, and may be concatenated to represent each video.

Using the test data set and the extracted feature data of each video, production quality measure server device 130 trains a machine-learning engine 132 to learn a statistical model on the extracted features to predict the human judgments of each set of videos. A statistical model is a mathematical formula that predicts a desired quantity (i.e., real value or membership within a class) from multiple extrinsic variants. The coefficients of the underlying mathematical formula are learned by optimizing an objective function employing the ground truth data. For instance, a statistical model can try to predict a real value, e.g. production quality score, based on multiple extrinsic factors, e.g. video features, video metadata, etc. The coefficients of this model would weight how various video features contribute towards predicting the production quality score.

For example, the video pairs are presented in training to the machine-learning engine 132 as a set of constraints that the learned model should satisfy, with some relaxations allowed. The learned model produced by the training of machine-learning engine 132 provides a method of weighting the relative importance of the extracted features, in order to produce rankings of videos in terms of production quality that are consistent with the human-judged ratings previously provided by the raters.

The learned model from machine-learning engine 132 is provided to production quality measure engine 134 to be applied to other uploaded content (new or already-existing content) in the shared content hosting platform 107. The production quality measure engine 134 uses the learned model to associate a "production quality" score to a video. In one implementation, a video of higher production quality is assigned a higher score by the learned model.

In some embodiments, the shared content hosting platform 107 continually or periodically runs iterations of testing at test data set collection server device 120 to maintain an up-to-date set of user opinions regarding production quality of videos. Furthermore, production quality measure server device 130 can update and adjust the learned model to take into account new extracted features from videos and new opinion input from raters. As such, the production quality measure applied by shared content hosting platform 107 can be dynamic and adaptable to the changing state of user opinion and to frequently adjusting technology and its associated measurements.

In some embodiments, the production quality score assigned to a video is utilized for a variety of use cases. In one embodiment, the production quality score is used to help determine search results produced by the shared content hosting platform 107. For example, the shared content hosting platform 107 may return search results with videos of comparable relevance. In embodiments of the disclosure, the production quality score of a video is used in conjunction with a relevance measure to further improve the quality of videos presented to a user, e.g., to list high quality videos first or highlight high quality videos, to improve users' overall experience with the shared content hosting platform 107. Alternatively, the user can be presented with the option of sorting relevant searches by production quality. In some embodiments, a similar re-ranking of related videos may be expected to improve click-through. Furthermore, a similar production quality bias can be introduced when sampling recommendations for a user from a set of videos, where some videos in the set are similar in content.

In another embodiment, the production quality score is used as feedback to users to inform them of the production quality of their uploaded content. A user can be provided diagnostic information regarding how they can improve their video based on the production quality measurement and score. For example, for a video captured in low-light with significant camera shake, the production quality measure server device 130 can indicate to the user that the video can be improved with better lighting and video stabilization.

In yet other embodiments, the production quality score provides advertisers a signal to decide how high a quality of video they would like to advertise with, and accordingly provide a mechanism to disambiguate ad pricing as well. For example, the advertisement space associated with higher quality videos may be priced more expensively than for advertisement space associated with lower quality videos.

In addition to the above-described use cases, the production quality score may be utilized for various other scenarios. For instance, the production quality score may be used in any scenario where the video production quality has an impact on user experience.

FIGS. 2-5 are flow diagrams of various embodiments of methods for automatic quantification of multimedia production quality. The methods are performed by processing logic that may comprise hardware (circuitry, dedicated logic, etc.), software (such as is run on a general purpose computer system or a dedicated machine), or a combination of both. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one embodiment, the methods of FIGS. 2-5 may be performed by shared content hosting platform 107 running on a server machine or other machine(s) as described with respect to FIG. 1.

Figure 2:
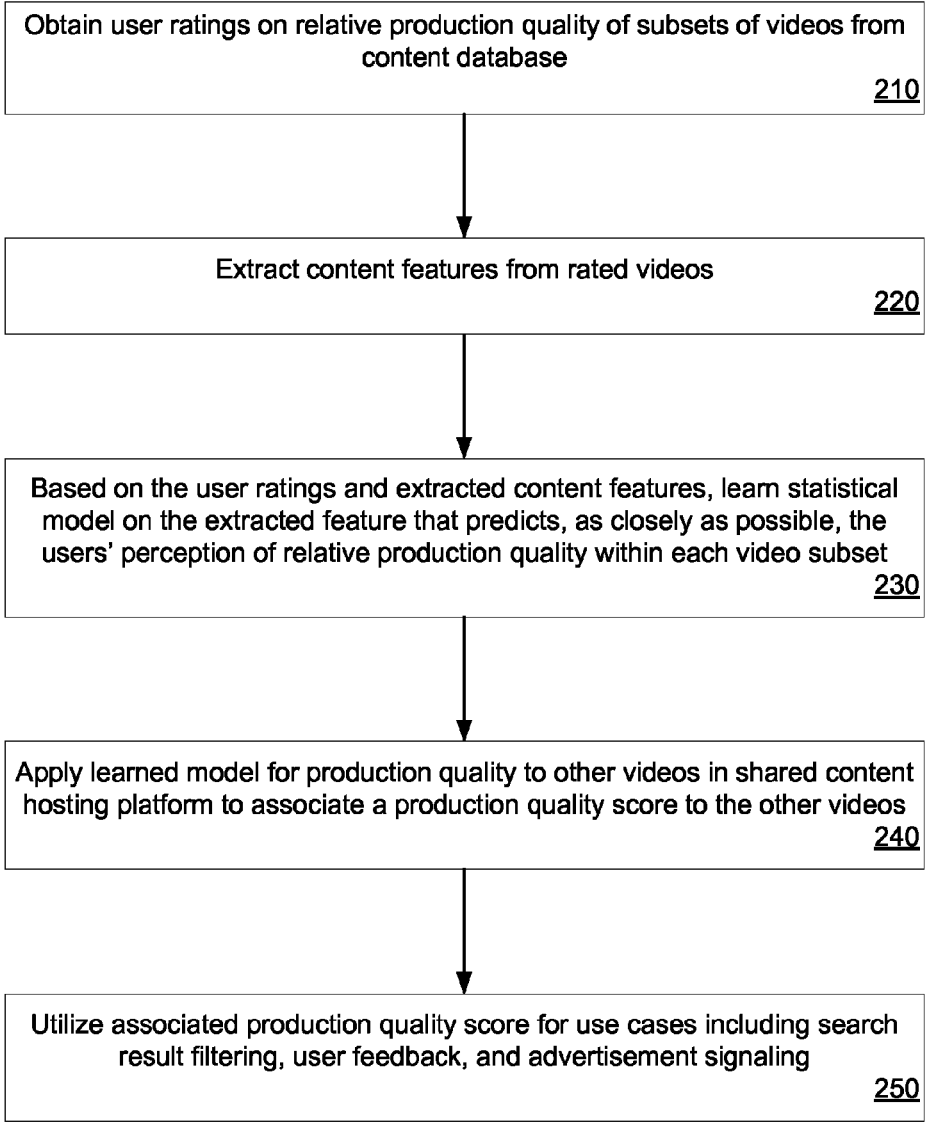
FIG. 2 is a flow diagram illustrating one embodiment for a method of automatic quantification of multimedia production quality.
Figure 3:
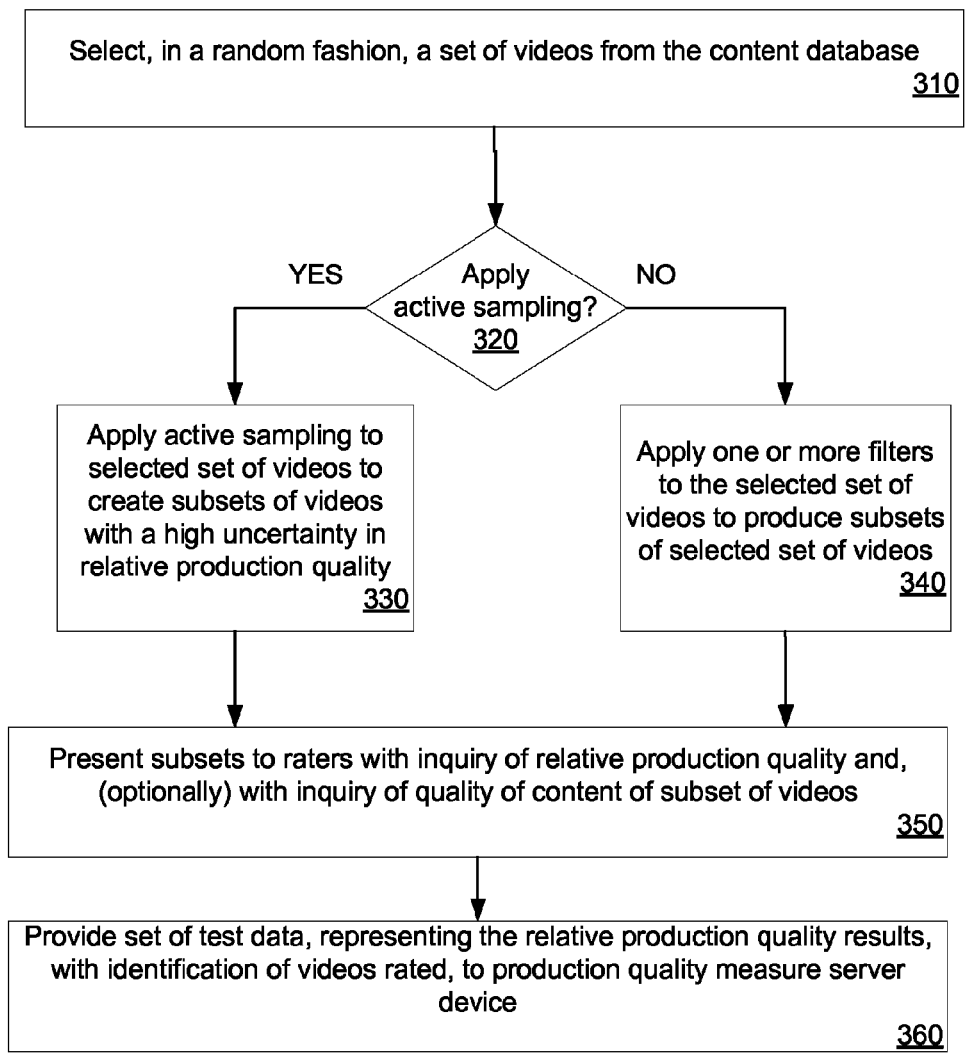
FIG. 3 is a flow diagram illustrating one embodiment for a method of obtaining a test data set for use in automatic quantification of multimedia production quality.

FIG. 2 is a flow diagram illustrating one embodiment for a method 200 of automatic quantification of multimedia production quality. At block 210 of method 200, user ratings on relative production quality of subsets of videos are obtained. In one embodiment, a subsets of videos are selected from a content data store (e.g., content database 140) of a shared content hosting platform. The content data store can include various videos uploaded to the shared content hosting platform. One embodiment of a method to obtain the user ratings is described with respect to FIG. 3 and method 300 below.

At block 220, content features are extracted from the rated videos. The content features may include a variety of classes of features that may be extracted from the video. For example, classes of features may include visual signals, audio signals, metadata, and text signals. At block 230, the user ratings and extracted content features are used to learn a statistical model on the extracted features. The statistical model is learned to predict (e.g., as closely as possible) the users' perception of relative production quality within each video subset. One embodiment of a method to model and predict production quality is described below with respect to FIG. 4 and method 400.

At block 240, the learned model for production quality is applied to other videos in the shared content hosting platform. A production quality score can be assigned to each of the other videos based on the results of applying the learned model to the other videos. At block 250, the associated production quality score is used in the shared content hosting platform. The score may be used in a variety of applications, such as search result filtering, providing feedback to users, and advertisement signaling. One embodiment of a method to calculate a production quality score and apply the calculated production quality score in different use cases is described below with respect to FIG. 5 and method 500.

As mentioned above, FIG. 3 is a flow diagram illustrating one embodiment for a method 300 of obtaining a test data set for use in the automatic quantification of multimedia production quality. In one embodiment, FIG. 3 may be performed by test data set collection server device 120 of FIG. 1. At block 310 of method 300, a set of content items, such as videos, from a content database is randomly selected.

At decision block 320, it is determined, e.g., based on configuration settings of a test data set collection server device, whether active sampling is to be applied to the randomly selected set of videos. If so, then at block 330, active sampling is applied to the selected set of videos to create subsets of videos (e.g., pairs, triplets, quadruplets, etc.). In active sampling, each video is initially assigned the same score and subsets are chosen randomly. As the system learns from user feedback, the system adapts the scores given to videos in the set. Eventually, the subset of videos selected are those that the test data set collection server device cannot readily distinguished in terms of production quality.

If active sampling is not to be applied at decision block 320, at block 340, one or more filters can be applied to the selected set of videos to create subsets of videos (e.g., pairs, triplets, quadruplets, etc.). A set of filter criteria for grouping videos into subsets may be configured in the test data set collection server. For example, the set of filter criteria may include upload date, length, magnitude of views, relative frame-rate, and encoding quality, to name a few examples. In this way, similar "types" of videos may be grouped together for purposes of production quality comparison, with less chance of one of these filtered criteria negatively affecting the relative production quality comparison.

At block 350, the subsets of videos are presented to raters for a relative production quality comparison. In one implementation, the rater is asked to select the video they believe has the best production quality within the subset of videos. The rater may also be allowed to select an option stating that there is no discernable difference in production quality between the videos in the subset. In some embodiments, the raters are also presented with an inquiry into the relative quality of content within the videos in the subset. This line of inquiry may help disambiguate selections based on content, rather than just production quality alone.

At block 360, a set of test data representing the relative production quality results, along with identification of the videos being rated, are provided to a production quality measure server device of the shared content hosting platform. The production quality measure server device can apply modeling and prediction of production quality of content utilizing the provided test data set.

As mentioned above, FIG. 4 is a flow diagram illustrating one embodiment for a method 400 of modeling and predicting production quality in a shared content hosting platform. In one embodiment, FIG. 4 is performed by production quality measure server device 130 of FIG. 1. At block 410 of method 400, a set of test data is received. In one embodiment, the set of test data includes results of relative production quality comparisons of subsets of videos by human raters. In some embodiments, the test data set is received from a test data set collection server of the shared content hosting platform.

At block 420, for each video of the received test data set, content features are extracted and/or obtained for use in a production quality score assessment. In some embodiments, the content features may include a variety of classes of features that may be extracted from the videos. For example, exemplary classes of features may include visual signals, audio signals, metadata, and text signals. Visual signals may include color composition, sharpness, blurriness, saturation, motion features such as subject motion and camera motion, definition type (i.e., HD, SD, etc.), resolution, and face features such as properties of faces detected in the video (e.g., how many faces, etc.). Audio signals may include loudness, spectrogram, stabilized auditory images, tone, timbre, melody, beats, tempo, and so on. Metadata may include information about the camera capturing the video, editing software, resolution, and so on. Text signals may include quality measures, such as spelling and grammar, on the text surrounding the video (e.g., title, description, and comments associated with the video). In one embodiment, the content features were previously extracted and stored by the shared content hosting platform upon receipt and processing of the video, and this extracted data is accessed by the production quality measure server for purposes of the production quality score assessment.

At block 430, a statistical model is learned on the extracted features that predicts, e.g., as closely as possible, the raters' perception of relative production quality within each video subset. In one embodiment, the subsets of videos are presented in training as a set of constraints that the learned model should satisfy, with some relaxations allowed. The learned model produced by the training provides a method of weighting the relative importance of the extracted features, which can be used to produce rankings of videos in terms of production quality that is consistent with the human-judged ratings previously provided by the raters. At block 440, based on the learned statistical model, production quality scores are assigned to each video.

At block 450, the learned model is provided to a production quality measure server to be applied to other uploaded content in the shared content hosting platform. At block 460, one or more iterations are run of the statistical model learning, the additional iterations using any new and/or updated received test data collection sets and any new and/or updated extracted features from the videos.

As mentioned above, FIG. 5 is a flow diagram illustrating one embodiment for a method 500 of calculating a production quality score and applying the calculated production quality score in different use cases. At block 510 of method 500, the production quality measure server applies the learned model to videos in the shared content hosting platform in order to associate a "production quality" score to a video. In one implementation, a video of higher production quality is assigned a higher score by the learned model.

At block 520, the production quality score is utilized as a filter for content items that are part of a search result returned by the shared content hosting platform. For example, the production quality score of a video can be used in conjunction with a relevance measure to aid in determining which video to present and/or how to present a video to a user in the search results. In some embodiments, the user is presented with the option of sorting relevant searches by production quality.

At block 530, the production quality score of a video is used to provide feedback to a user owning the content item. In one embodiment, the feedback provided to the user regards features of the content item that can be improved in order to increase the overall production quality score of the video. At block 540, the production quality score of the video is used for advertisement placement. For example, in one embodiment, the production quality score is used to differentiate placement options for an advertisement, such as placing ads only with videos having a production quality over a predetermined score. As another example, the production quality score can also be used to differentiate pricing between advertisement spaces (e.g., placing a premium on advertising with high production quality videos).

One skilled in the art will appreciate that the various use cases for production quality scores are not limited to the above described examples, and that other use cases are envisioned and encompassed by embodiments of the disclosure.

Figure 6:
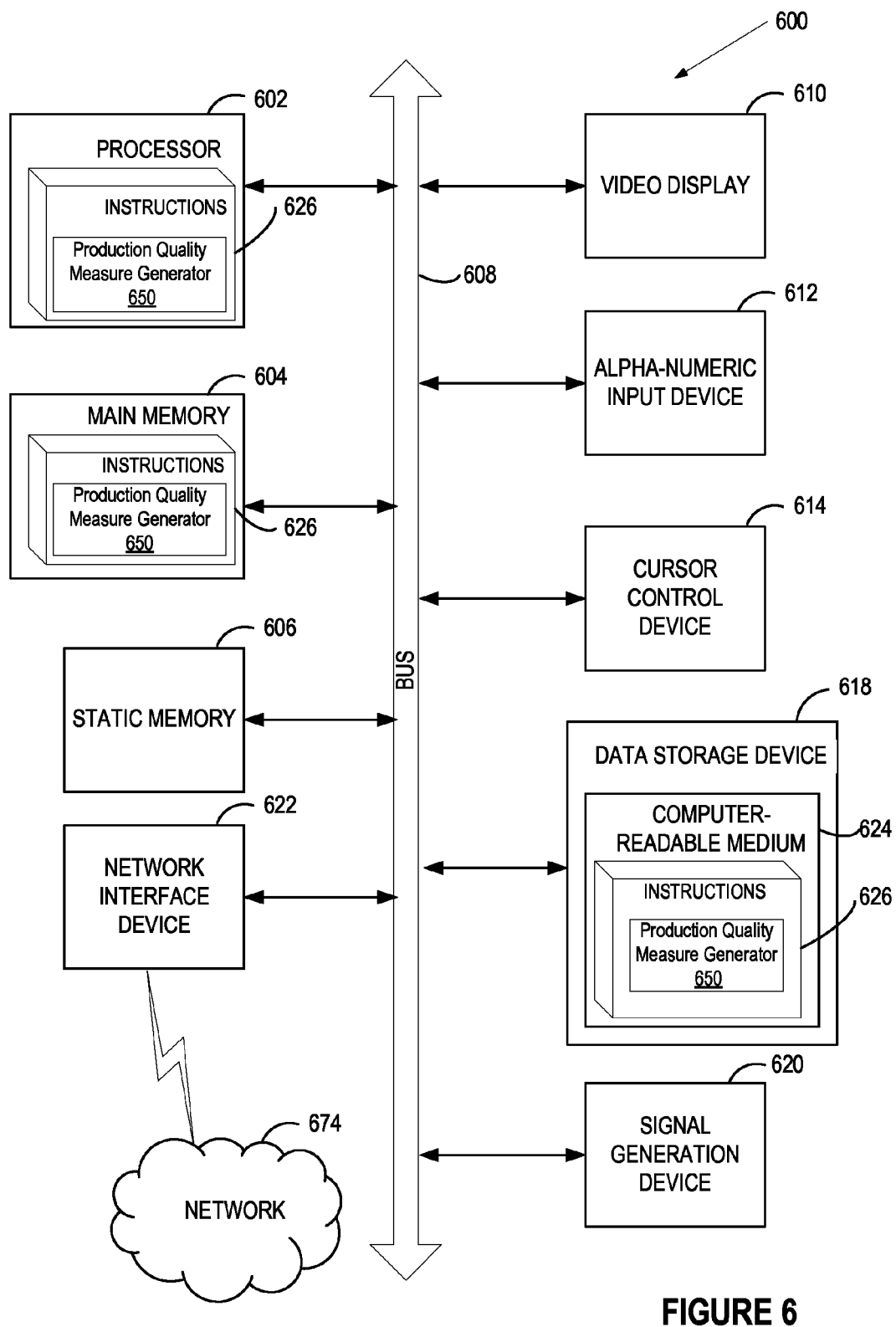
FIG. 6 is a block diagram of an exemplary computer system that may perform one or more of the operations described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a laptop, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein, illustrated in FIG. 6 by depicting instructions 626 within processor 602.

The computer system 600 may further include a network interface device 622. The computer system 600 also may include a video display unit 610 (e.g., a liquid crystal display (LCD), a cathode ray tube (CRT), or a touchscreen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for a production quality measure generator 650, which may correspond to production quality measure server 130 of FIG. 1 for example, and/or a software library containing methods that call a production quality measure server. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A computer-implemented method comprising:
providing, by a computing device, a subset of a set of content items for user comparison of production quality of the content items of the subset, wherein the subset is selected from the set of content items using active sampling;
receiving a user selection of a content item of the subset, wherein the user selection is to indicate user perception of higher relative production quality over other content items of the subset;
assembling, by the computing device, data samples corresponding to a plurality of users, the data samples corresponding to user selections, each of the corresponding user selections indicating higher relative production quality within the set of content items;
extracting content features from each of the content items in the set;
learning, by the computing device based on the data samples from the plurality of users, a statistical model on the extracted content features, wherein learning the statistical model comprises assigning weight factor values to the extracted content features to predict the user selections indicating higher relative production quality for the set of content items;
applying, by the computing device, the learned statistical model to extracted content features of another content item that is not part of the set of content items; and
assigning, via applying the learned statistical model, a production quality score to the another content item using the assigned weight factor values, the production quality score to indicate the relative production quality of the another content item.

2. The method of claim 1, wherein the content features comprise at least one of visual signal features, audio signal features, metadata, or text signal features.

3. The method of claim 1, wherein assembling the data samples further comprises:
presenting different subsets of the set of content items to each of the plurality of users; and
receiving, from each of the different subsets, a user selection of a content item of the different subset that indicates a user perception of a higher relative production quality over the other content items of the different subset.

4. The method of claim 3, wherein the different subsets are selected from the set of content items via the active sampling.

5. The method of claim 1, further comprising providing, to an owner of the another content item, a production quality score of the another content item as feedback to inform the owner of:
the user perception of the production quality of the another content item; and
one or more content features of the another content item that can be improved to increase the production quality score of the another content item.

6. The method of claim 1, further comprising providing the production quality score as metadata of the another content item, wherein the metadata is used to filter the another content item with respect to other content items in a search result.

7. The method of claim 1, further comprising utilizing the production quality score as a factor for advertisement placement associated with the another content item.

8. The method of claim 1, wherein the learned statistical model weights the relative importance of each of the extracted content features in terms of the relative production quality.

9. The method of claim 1, further comprising applying the learned statistical model to extracted content features of the another content item that are not part of the set of content items in order to assign the production quality score to the another content item.

10. A non-transitory computer readable storage medium having instructions that, when executed by a processing device, cause the processing device to perform operations comprising:
providing, by a processing device, a subset of a set of content items for user comparison of production quality of the content items of the subset, wherein the subset is selected from the set of content items using active sampling;
receiving a user selection of a content item of the subset, wherein the user selection is to indicate user perception of higher relative production quality over other content items of the subset;
assembling, by the processing device, data samples corresponding to a plurality of users, the data samples corresponding to user selections, each of the corresponding user selections indicating higher relative production quality within the set of content items;
extracting content features from each of the content items in the set;
learning, by the processing device based on the data samples from the plurality of users, a statistical model on the extracted content features, wherein learning the statistical model comprises assigning weight factor values to the extracted content features to predict the user selections indicating higher relative production quality for the set of content items;
applying, by the processing device, the learned statistical model to extracted content features of another content item that is not part of the set of content items; and
assigning, via applying the learned statistical model, a production quality score to the another content item using the assigned weight factor values, the production quality score to indicate the relative production quality of the another content item.

11. The non-transitory computer readable storage medium of claim 10, wherein the extracted content features comprise at least one of visual signal features, audio signal features, metadata, or text signal features.

12. The non-transitory computer readable storage medium of claim 10, wherein the assembling the data samples comprises:
presenting different subsets of the set of content items to each of the plurality of users; and
receiving, from each of the different subsets, a user selection of a content item of the different subset that indicates a user perception of a higher relative production quality over the other content items of the different subset.

13. The non-transitory computer readable storage medium of claim 10, wherein the operations further comprise providing, to an owner of the another content item, a production quality score of the another content item as feedback to inform the owner of:

the user perception of the production quality of the another content item; and one or more content features of the another content item that can be improved to increase the production quality score of the another content item.

14. The non-transitory computer readable storage medium of claim 10, wherein the operations further comprise providing the production quality score as metadata of the another content item, wherein the metadata is used to filter the another content item with respect to other content items in a search result.

15. The non-transitory computer readable storage medium of claim 10, wherein the operations further comprise utilizing the production quality score as a factor for advertisement placement associated with the another content item.

16. A computing device comprising:
a memory; and
a processing device coupled to the memory, wherein the processing device is configured to:
provide a subset of a set of content items for user comparison of production quality of the content items of the subset, wherein the subset is selected from the set of content items using active sampling;
receive a user selection of a content item of the subset, wherein the user selection is to indicate user perception of higher relative production quality over other content items of the subset;
assemble data samples corresponding to a plurality of users, the data samples corresponding to user selections, each of the corresponding user selections indicating higher relative production quality within the set of content items;
extract content features from each of the content items in the set;
learn, based on the data samples from the plurality of users, a statistical model on the extracted content features, wherein learning the statistical model comprises assigning weight factor values to the extracted content features to predict the user selections indicating higher relative production quality for the set of content items;
apply the learned statistical model to extracted content features of another content item that is not part of the set of content items; and
assign, via applying the learned statistical model, a production quality score to the another content item using the assigned weight factor values, the production quality score to indicate the relative production quality of the another content item.

17. The computing device of claim 16, wherein the extracted content features comprise at least one of visual signal features, audio signal features, metadata, or text signal features.

18. The computing device of claim 16, wherein the processing device is further configured to:
present different subsets of the set of content items to each of the plurality of users; and
receive, from each of the different subsets, a user selection of a content item of the different subset that indicates a user perception of a higher relative production quality over the other content items of the different subset.

19. The computing device of claim 18, wherein the different subsets are selected from the set of content items via the active sampling.

20. The computing device of claim 18, wherein the set of content items is a set of videos and the subset is selected from the set of videos via filtering based on at least one of: upload date, video length, or order of magnitude of views.

* * * * *